United States Patent [19]

Routh et al.

[11] 4,219,885
[45] Aug. 26, 1980

[54] SONAR TARGET SIMULATOR

[75] Inventors: Claude C. Routh; Keith E. Geren, both of San Diego; Peter Huisveld, Jr., National City, all of Calif.; Milton D. Papineau, Kailoa, Hi.

[73] Assignee: The United States of America as represented by the Secretary of the Navy, Washington, D.C.

[21] Appl. No.: 395,101

[22] Filed: Sep. 8, 1964

[51] Int. Cl.$^2$ .............................................. G09B 9/00
[52] U.S. Cl. ......................................... 367/1; 35/10.4
[58] Field of Search ...................... 35/10.4; 340/5 D; 367/1

[56] References Cited

U.S. PATENT DOCUMENTS

| | | | |
|---|---|---|---|
| 2,887,671 | 5/1959 | Frankel et al. | 35/10.4 X |
| 3,180,295 | 4/1965 | Niederer | 367/1 X |
| 3,311,868 | 3/1967 | Cupp et al. | 367/1 |
| 3,642,999 | 2/1972 | Murphree | 35/10.4 |
| 3,649,735 | 3/1972 | Coburn et al. | 35/10.4 |

Primary Examiner—T. H. Tubbesing

Attorney, Agent, or Firm—R. S. Sciascia; E. F. Johnston; T. L. Styner

EXEMPLARY CLAIM

1. A system for simulating wave reflections from an irregular-shaped moving object which has been illuminated with energy of frequency F, said system comprising;
    a receiver (10) for said frequency F;
    a generator (14) of white noise voltage;
    means (13) for amplitude modulating frequency F with said white noise voltage to generate random bursts of frequency F;
    a radiating transducer (11);
    a bandpass filter (18) having a passband including said frequency F, the output of said filter being coupled to the input of said transducer, and the input of said filter being coupled to the output of said modulator means (13) to radiate said random bursts of frequency F;
    a second signal path between said modulator and filter including a time delay network (30) for randomly distorting the radiated bursts.

5 Claims, 1 Drawing Figure

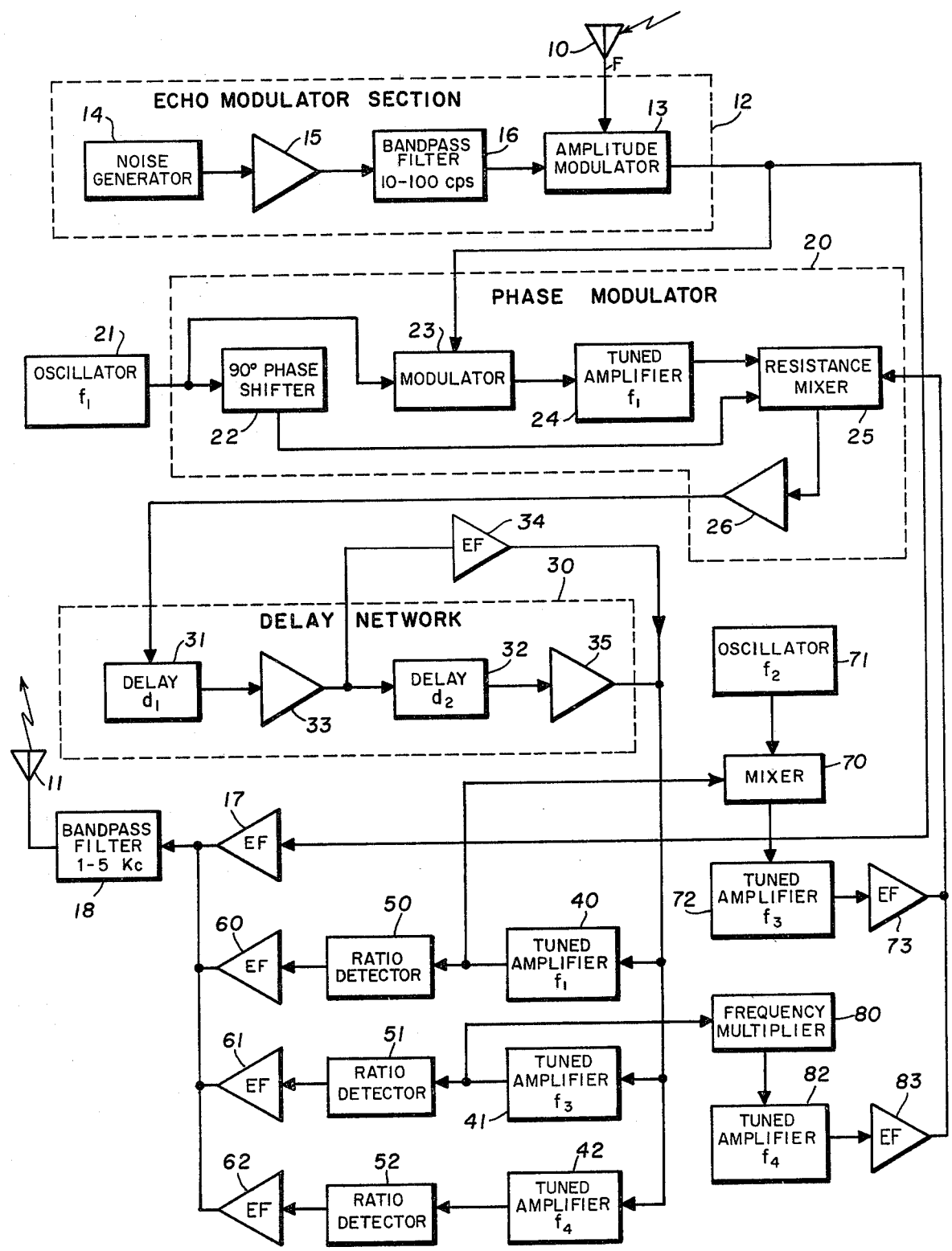

SONAR TARGET SIMULATOR

The invention described herein may be manufactured and used by or for the Government of the United States of America for governmental purposes without the payment of any royalties thereon or therefor.

This invention relates to sonar target simulators of the type which can receive sonar pings and modify and reradiate the ping signals so as to resemble the sonar echo signal from a moving target ship.

The object of this invention is to provide an improved sonar target simulator.

The generation of a signal which, when presented on a display screen is indistinguishable from a genuine echo signal, has obvious tactical implications. The generator for such purposes can be employed in equipment for training sonar operators, or can be employed in an anchored or moving repeater for decoying the enemy. The principal change in a sonar ping when bounced off the side of a ship is its elongation. The elongation of a ping caused by the reflection from a submarine hull varies roughly as the cosine of its aspect angle as a target. The minimum elongation is about 24 milliseconds which occurs at the beam aspect. As the target shifts, the amount of elongation changes, and it has been found that a submarine at an aspect angle of 12° relative to either beam, elongates the echo about 30 milliseconds.

The problem of simulating a convincing echo signal is further complicated by the random changes of "high lights" from different points on the reflecting surface of the moving target. The surfaces and inner compartments of a submarine vary widely in their reflecting ability and also in the sound travel time to reach them. The acoustic return from a moving ship must account for the varying levels and varying phase relations from the different portions of the target. The echo ping understandably has a ragged appearance due to phase cancellations and additions as well as the varied target strengths of the sources. Echo signals from a submarine target at a 12° aspect angle were found to have modulation frequencies arranging from about 67 to 333 cycles per second. The lowest frequency, 67, is probably caused by two main reflecting portions of the submarine including the bow, the conning tower and the stern. It is noted that the time difference of ping arrival at the bow and stern of a standard submarine standing at the 12° aspect angle is about 15 milliseconds which corresponds to 67 cycles. Other significant returns have delays whose value run rather continuously from 15 milliseconds to as short as 3 milliseconds, the 3 millisecond time corresponding to 333 cycles per second.

It is accordingly another object of this invention to provide a generating system for simulating the above mentioned amplitude and phase modulations of the ping signal.

The objects of this invention are obtained by first modulating the received signals with selected band of noise from a white noise generator to give the received signal the gross random character of reflections from rough sides of a ship at an approximate aspect angle of 12°. This signal is passed through a filter having the passband characteristics to selectively pass all of the frequencies of the received signals. The filter output is reradiated directly. A second signal path is provided between the output of the white noise modulator and the output filter, including a time delay network, for randomly and grossly distorting the radiated signal bursts. To further refine the illusion of a genuine echo signal, the signal in the second path is recirculated two or more times through the delay network, the signal after each recirculaton being added to the output signal. Each recirculated sample, fed back from the output to the input of the delay network, is modulated upon a different carrier. The carrier and undesired modulation products are eliminated in the output bandpass filter before radiation.

Other objects and features of this invention will become apparent to those skilled in the art by referring to the specific embodiment described in the following specification and shown in the accompanying drawings in which the single FIGURE comprises a block diagram of the embodiment.

The sonar signal received from the enemy is received by the hydrophone 10 and after processing in the system of this invention is reradiated from the transducer 11. The received signal will normally comprise pings or bursts of acoustic energy of frequency F. For convenience, it will be assumed that the frequency F will lie in the 1 to 5 kilocycles per second band. This frequency may or may not be given a doppler shift frequency component to simulate relative motion of the repeater of this invention and the signal source. Frequency F is combined in modulator 13 of the echo modulator section 12 with random pulses generated by the noise generator 14. Preferably, frequency response of the amplifier 15 and of the bandpass filter 16 gives a noise spectrum output of significant level from about 10 to 100 cycles per second. Preferably, the filter 16 is the sloped bandpass type and is peaked at 20 cycles per second. The white noise components thus selected modulate the frequency F in modulator 13.

One output of the modulator 13 moves through the emitter follower amplifier 17 to the filter 18 and hence to the radiating transducer 11. The filter 18 is of the bandpass type to eliminate all components except the 1 to 5 kc band assumed for the received frequency, F.

A second path between the output of modulator 13 and the input of bandpass filter 18 includes the phase modulator 20, the delay network 30, the tuned amplifier 40, the ratio detector 50, and the emitter follower 60. This second path provides gross changes in the elongation of the original noise modulated signal.

The output of modulator 13 is impressed upon the locally generated frequency $f_1$ obtained in oscillator 21. Preferably $f_1$ is phase modulated by the noise modified frequency F. The particular phase modulating system shown comprises the 90° phase shifter 22, the amplitude modulator 23, the tuned amplifier 24 and the resistance mixer 25. The amplitude modulations of modulator 23 are added to the 90° phase shifted carrier $f_1$ in the resistance mixer 25 to produce at the output of the emitter follower 26 a resultant including the phase-modulated 1 to 5 kc component plus the noise frequencies 10 to 100 cps. There results also amplitude modulations at the $f_1$ frequencies but these are minimized because of the 90° displacement.

The delay network 30, connected to the output of the phase modulator, preferably comprises two delay lines 31 and 32 producing delays respectively, $d_1$ and $d_2$. If $d_1$ and $d_2$ are each 5 milliseconds, the total delay of the network is 10 milliseconds. The signal at the available tap between the two delays is passed through emitter follower 34 to the output terminal of the network 30, lends flexibility to the design of the system, as will appear. Amplifiers 26 and 33 provide ample gain to drive the delay line coils. Amplifier 35 may be found desirable for adjusting the relative amplitudes of the differently delayed portions of the signal. The output of the delay network passes through the tuned amplifier 40 to select the $f_1$ frequency. The output of the amplifier is detected in the detector 50 which preferably is of the ratio detector type to extract frequency F with phase modulated noise components. The output of the ratio detector passes through the emitter follower 60 and is added to the output of emitter follower 17 in the bandpass filter 18 before radiaton by the transducer 11.

To further increase the elongation of the ping pulse and to further increase the complexity of the additions and subtractions of the various random phase components, each ping pulse may be circulated according to this invention two or more times through the delay network 30. The specific feedback circuits shown in the drawing will now be considered. A portion of the signal at the output of the tuned amplifier 40 is directed to one input of mixer 70 where it is modulated upon the carrier $f_2$, generated by oscillator 71. One of the sidebands, $f_3$, of the modulation products is selected by tuned amplifier 72 and after feeding through isolation emitter follower 73, is directed into the input end of the delay network. Conveniently, $f_3$ is added into the signal in the resistance mixer 25. The particular product of frequency $f_3$ selected and recirculated through the delay line is so chosen as to be well removed from $f_1$ or F so as to minimize the likelihood of ringing i.e. build-up of destructive regenerative feedback. $f_3$ is selected by tuned amplifier 41, is detected by ratio detector 51, is passed by isolation emitter follower 61, and is added to the radiated energy from transducer 11.

An additional recirculation of the ping information through the delay line may be effected by taking a portion of the signal from the output of tuned amplifier 41, feeding it into the frequency multiplier 80 and selecting in tuned amplifier 82 a component $f_4$ which is again well removed from $f_3$ or any of its residual components to prevent ringing. The output of amplifier 82 is fed through isolation emitter follower 83 and is also inserted into the beginning of the delay network via the resistance mixer 25. After this new delay in network 30, the $f_4$ component is selected in tuned amplifier 42 which is detected by ratio detector 52, is passed by isolation emitter follower 62 and hence is applied through bandpass filter 18 to the radiating transducer 11. Further "highlight" modulation and ping amplitude break-up is generated by feeding the output of the first delay section directly to the output of the delay network through emitter follower 34 and by-passing delay $d_2$. Two pings result at the delay network output for each input ping. On the second recirculation the two pings give rise to four and on the third circulation these give rise to eight. Each has its own delay and amplitude.

It has been demonstrated that the ping signals after the multiple delay treatment in the network 30 is indistinguishable from an actual reflected signal from the side of a submarine.

What is claimed is:

1. A system for simulating wave reflections from an irregular-shaped moving object which has been illuminated with energy of frequency F, said system comprising:
    a receiver (10) for said frequency F;
    a generator (14) of white noise voltage;
    means (13) for amplitude modulating frequency F with said white noise voltage to generate random bursts of frequency F;
    a radiating transducer (11);
    a bandpass filter (18) having a passband including said frequency F, the output of said filter being coupled to the input of said transducer, and the input of said filter being coupled to the output of said modulator means (13) to radiate said random bursts of frequency F;
    a second signal path between said modulator and filter including a time delay network (30) for randomly distorting the radiated bursts.

2. The system defined in claim 1 further comprising;
    a feedback circuit coupled between the output and input of said delay network for recirculating said bursts through said network to increase the numbers of distorting components radiated by said transducer.

3. The system defined in claim 1 further comprising;
    a first feedback circuit coupled between the output and input of said delay network for recirculating said bursts through said network to increase the number of distorting components radiated by said transducer, and
    a second feedback circuit coupled between the output and input of said delay network for recirculating said bursts through said network to increase the numbers of distorting components radiated by said transducer, and means included in said feedback circuits including frequency modulators for uniquely distinguishing in frequency each ping signal as the signal is recirculated to prevent ringing.

4. A system for simulating wave reflections from an irregular shaped moving object which has been illuminated with energy of frequency F said system comprising:
    a receiver (10) for said frequency F;
    a generator (14) of white noise voltage;
    means (13) for amplitude modulating frequency F with said white noise to generate random bursts of frequency F;
    a radiating transducer (11);
    a bandpass filter (18) having a bandpass including said frequency F, the output of said filter being coupled to the input of said transducer and the input of said filter being coupled to the output of said modulating means (13);
    a second signal path between said modulator and said filter including a phase modulator (20) for modulating the output of said modulator (13) upon a first carrier $f_1$, a delay network (30) and an amplifier (40) tuned to $f_1$ connected in series between the output of said modulator (13) and the input of said bandpass filter (18).

5. The system defined in claim 4 further comprising;
    means (70) for sampling the output of said tuned amplifier $f_1$ and modulating it upon a second carrier $f_2$, to produce frequency $f_3$;
    means for directing $f_3$ through said delay line; and
    means at the output of said delay line for selecting said $f_3$ and applying said $f_3$ to said radiating transducer.

* * * * *